United States Patent [19]

Scheurer et al.

[11] Patent Number: 4,978,566
[45] Date of Patent: Dec. 18, 1990

[54] COMPOSITE BEVERAGE COASTER

[75] Inventors: Robert S. Scheurer, 1627 Midwestern Pkwy., Wichita Falls, Tex. 76302; Robert G. Heavers, Aurora, Colo.

[73] Assignee: Robert S. Scheurer, Wichita Falls, Tex.

[21] Appl. No.: 375,490

[22] Filed: Jul. 5, 1989

[51] Int. Cl.[5] .................. B32B 3/26; A47G 29/00
[52] U.S. Cl. .................. 428/157; D7/624; 248/346.1; 428/64; 428/159; 428/160; 428/304.4; 428/316.6
[58] Field of Search .................. D7/624; 248/346.1; 428/36.5, 64, 157, 159, 160, 304.4, 316.6

[56] References Cited

U.S. PATENT DOCUMENTS

| | | | |
|---|---|---|---|
| 3,797,796 | 3/1974 | Lansdowne | 248/346.1 |
| 4,137,356 | 1/1979 | Shoemaker et al. | 248/346.1 |
| 4,206,570 | 6/1980 | Cooper | 428/64 |
| 4,540,611 | 9/1985 | Henderson | 428/36.5 |

Primary Examiner—William J. Van Balen
Attorney, Agent, or Firm—Dennis T. Griggs

[57] ABSTRACT

A reusable, composite coaster for use with a beverage container is characterized by a base substrate of open cell foam material which is heat fusion and pressure bonded to a cover substrate of polymeric fabric material. The open weave of the polymeric fabric material permits moisture to drain into the open cell foam layer, while preventing the buildup of a partial vacuum between the bottom surface of a beverage container and the coaster surface. Moreover, the polymeric fabric cover substrate increases the tear resistance of the assembly, while the open cell foam layer increases the reservoir capacity of the composite assembly.

7 Claims, 1 Drawing Sheet

U.S. Patent    Dec. 18, 1990    4,978,566
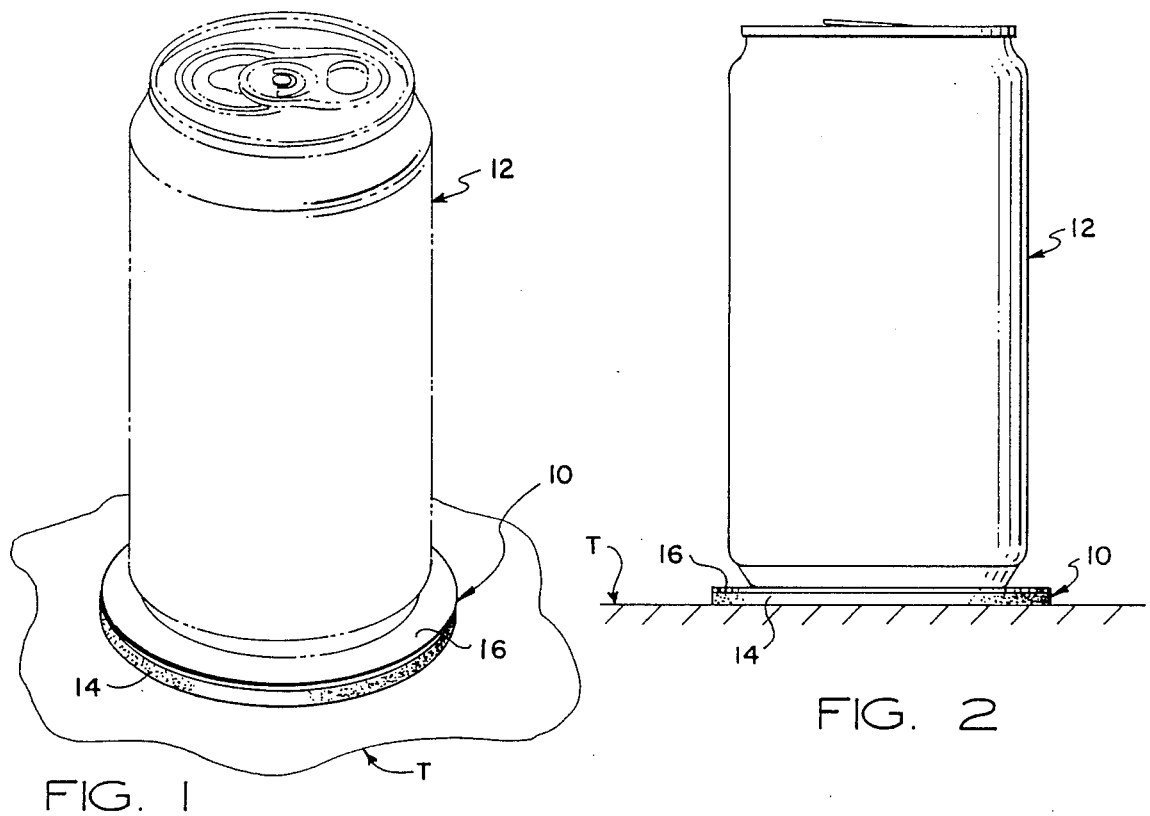
FIG. 1
FIG. 2
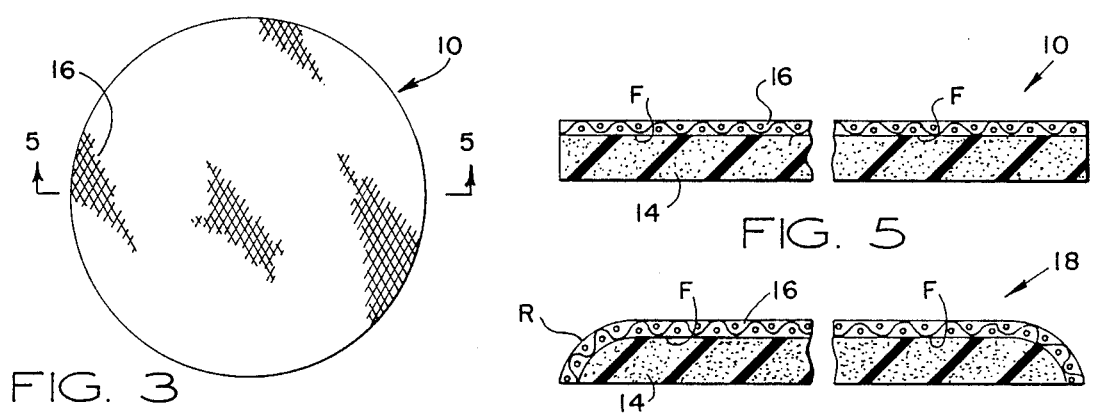
FIG. 3
FIG. 5
FIG. 6
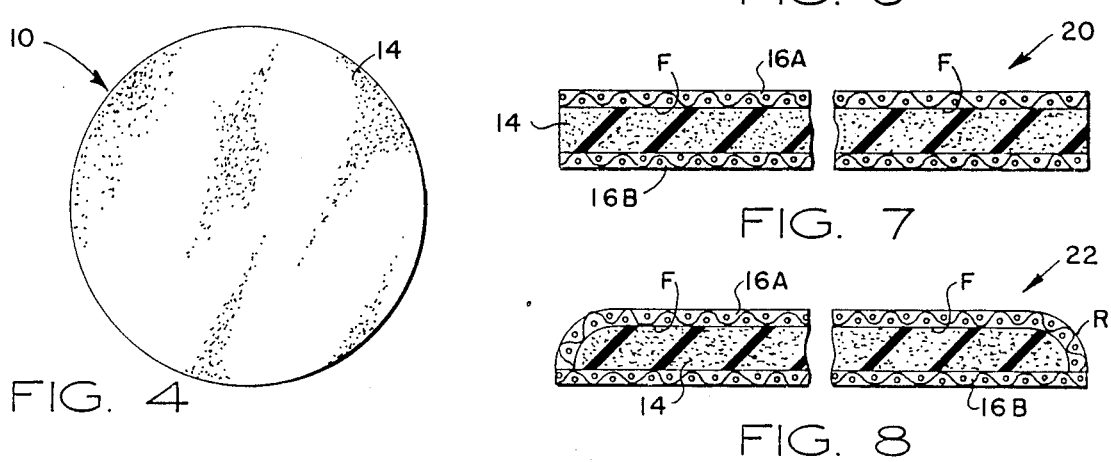
FIG. 4
FIG. 7
FIG. 8

COMPOSITE BEVERAGE COASTER

BACKGROUND OF THE INVENTION

1. Field of the Invention

This invention relates to coasters which are used with drinking glasses, beverage containers and the like.

2. Description of the Prior Art

A coaster is a small mat, dish or tray which is placed onto a supporting surface under a drinking glass or beverage container to protect the supporting surface from exposure to moisture and scratching engagement. Perhaps the most commonly used coaster is a paper mat or napkin which is placed under or wrapped around the bottom of a beverage container. Such an arrangement has good moisture absorbency, but when saturated, tends to tear apart easily, and therefore can be used only once before it must be replaced.

Another popular coaster is a cork disk or a plastic tray having a well for accumulating moisture condensate which forms on the outside of a drinking glass. A limitation which is common to both cork and plastic coasters alike is that a partial vacuum often forms beneath the bottom end of the glass and the coaster surface, which causes the coaster to adhere to the bottom of the glass as the glass is lifted. When this occurs, and as the glass is lifted and tilted, the partial vacuum is released whereupon the coaster falls to the floor or onto the clothing of the person holding the glass.

OBJECTS OF THE INVENTION

It is, therefore, the principal object of the present invention to provide a composite coaster having improved absorbency and tear resistance.

Another object of the invention is to provide a reusable, absorbent coaster which is inexpensive and may be manufactured by mass production techniques Yet another object of the invention is to provide an improved coaster for use with a drinking glass which will not adhere to the bottom of the drinking glass or container when moistened.

A related object of the invention is to provide an improved coaster of the character described, which does not cling to the bottom of a beverage container, thereby permitting the beverage container to be moved about independently of the coaster.

Another object of the invention is to provide an improved, reusable coaster having increased moisture accumulation and retention.

Another object of the invention is to provide a reusable, absorbent coaster having a soft, non-abrasive outer surface which can be safely placed on furniture without risk of scratching or marking the furniture surface.

SUMMARY OF THE INVENTION

According to novel aspects of the invention, the foregoing objects are achieved by a reusable coaster which is a composite assembly of a substrate of open cell foam material and a substrate of polymeric fabric material superposed onto the open cell foam substrate and bonded thereto. In the preferred embodiment, the open cell foam substrate is constructed of a sheet of flexible polyurethane, and the covering substrate is constructed of a sheet of polyester fabric material The open weave of the polymeric fabric material permits moisture to drain into the open cell foam layer, while preventing the buildup of a partial vacuum between the bottom surface of a glass or can and the coaster surface. Moreover, the soft, pliable open cell foam substrate prevents scraping or scratching engagement against an underlying support surface. The composite coaster is tear resistant, washable and can be squeezed dry.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 1 is a perspective view of a coaster and beverage can;

FIG. 2 is a side elevation view of the coaster and beverage can shown in FIG. 1;

FIG. 3 is a top plan view of the composite coaster shown in FIG. 1;

FIG. 4 is a bottom plan view of the composite coaster of FIG. 3;

FIG. 5 is an enlarged sectional view of the composite coaster taken along the lines 5—5 of FIG. 3;

FIG. 6 is an enlarged sectional view of a composite coaster assembly similar to that shown in FIG. 5, in an alternative embodiment in which the edge of the coaster disk is rolled;

FIG. 7 is an enlarged sectional view of a composite coaster assembly having a substrate of open cell foam material sandwiched between sheets of polymeric fabric; and, FIG. 8 is an enlarged sectional view of a composite coaster assembly similar to that shown in FIG. 7, in an alternative embodiment in which the edge of the coaster disk is rolled.

DETAILED DESCRIPTION OF THE PREFERRED EMBODIMENTS

In the description which follows, like parts are identified throughout the specification and drawings with the same reference numerals, respectively. The drawings are not necessarily to scale and in certain views, the dimensions have been enlarged and the proportions of certain parts have been exaggerated to more clearly depict certain features of the invention.

Referring now to FIG. 1 and FIG. 2, a composite coaster 10 is illustrated in the preferred embodiment as a flat disk for engaging the bottom end of an aluminum beverage can 12 and shielding it from the finished surface of a table T. The composite coaster 10 has a base section 14 which is bonded to a cover section 16. The base section 14 and cover section 16 are joined together in superposed relation, and are cut in the form of a circular disk Preferably, the base section 14 is a substrate of flexible, polyurethane open cell foam having a density of from about ½ to 2 pounds per cubic foot. In the preferred embodiment, the open cell foam base substrate 14 is cut from a sheet of open cell polyurethane foam having a thickness of approximately 3/32 inch.

The cover substrate 16 is preferably made of stretch a able polymeric fabric material, for example polyester fiber which is woven in a fabric sheet. In the preferred embodiment, the polyester fiber substrate 16 has a thickness of approximately 1/32 inch.

The polymeric fabric cover substrate 16 is bonded to the open cell foam base substrate 14 by flame lamination. The polymeric fabric cover substrate 14 becomes fusion bonded along the interface F with the open cell foam base substrate 14 as a result of compression forces and heat which are applied during manufacture.

Referring now to FIGS. 3 and 4, the composite coaster 10 is cut in the form of a circular disk after the base substrate 14 has become fusion bonded to the cover substrate 16. The porous, stretchable cover panel 16 forms a base support for the beverage container 12. A soft, pliable bottom surface is provided by the open cell foam substrate 14. According to this arrangement, the open weave of the polymeric fabric material in the cover substrate 16 permits moisture condensate on the chilled beverage container 12 to drain into the open cell foam base substrate 14, while preventing the buildup of a partial vacuum between the bottom surface of the beverage container 12 and the coaster.

As can be seen in FIG. 5, the open cell foam substrate 14 defines a reservoir which is in fluid communication with the superposed polymeric fabric substrate 16. Accordingly, moisture condensate drains by gravity flow along the sidewall of the chilled beverage container 12, and then is drawn by gravity flow and capillary action through the open weave of the polymeric fabric substrate 16 and into the underlying open cell foam base substrate 14.

The fabric cover substrate 16 is preferably made of a double-stretch polymeric fabric material, for example polyester fiber which is woven in a fabric sheet. In the embodiment shown in FIG. 6, stretchability of the fabric is desired to achieve a wrinkle-free surface and a rolled peripheral edge R during the die cutting step. Because of its stretch capability, the woven polyester fabric 16 can be rolled about the curved edge of the open cell foam base layer 14.

For example, a composite coaster 18 as shown in FIG. 6 is produced by die cutting a sheet of the prebonded substrates 14, 16 in a cold press. Preferably, the substrate 14 is a layer of "clickable" open cell foam which is characterized by a low mechanical memory. That is, when the "clickable" open foam layer 14 is compressed, it tends to retain its compressed state and does not return to its original condition.

The sheet of prebonded substrates is placed inside of a cold press, and the coaster disk 18 is cut in a circular configuration by a die having a curved molding surface. The result is the composite coaster 18 having a rolled peripheral edge R as shown in FIG. 6.

Referring now to FIG. 7, a substrate 14 of open cell foam material is sandwiched between an upper substrate 16A of polymeric fabric material and a lower substrate 16B of polymeric fabric material The open cell foam substrate is bonded to the upper and lower fabric substrates 16A, 16B, respectively, by flame lamination, and is subsequently die cut in a cold press, thereby providing a composite coaster assembly 20. In this embodiment, a polymeric fabric surface is bonded on both sides of the open cell foam layer 14. The resulting composite coaster assembly 20 of FIG. 7 has improved tear resistance as compared with the composite coaster assembly shown in FIGS. 5 and 6.

Moreover, the polymeric fabric covering substrates 16, 16A and 16B are resistant to scuffing, tearing, scraping and cutting by sharp objects. The combination of a polymeric fabric substrate with an open cell foam substrate provides a durable surface which is also soft to the touch and promotes air and water circulation into the open cell foam substrate.

Referring now to FIG. 8, yet another alternative embodiment of a composite coaster assembly 22 is illustrated. In this arrangement, a rolled peripheral edge R is formed during manufacture as previously described.

It will be appreciated that because of the open cell foam layer and durable polymeric fabric covering, each embodiment provides improved moisture absorbency and tear resistance. Moreover, the composite coaster assemblies are manufactured from inexpensive and readily available materials which are easily handled and formed by mass production techniques. Moreover, because of the open weave of the polymeric fabric cover substrate, the coaster will not adhere to the bottom of a beverage container since partial vacuum conditions are dissipated through the open weave of the fabric material. Finally, since both the polymeric fabric cover material and the open cell foam material are soft and pliable, the composite coaster can be safely used on furniture without risk of scratching or marking the furniture surface.

From the foregoing description of the preferred embodiments of the invention, those skilled in the art will appreciate that the reusable composite coaster of the present invention represents a substantial improvement over conventional coasters of paper, cork and hard plastic constructions. Although certain preferred embodiments of the invention have been described in detail, it should be understood that various changes and alterations can be made therein without departing from the spirit and scope of the invention as defined by the appended claims.

What is claimed is:

1. A composite coaster for use with a beverage container comprising a first substrate of open cell foam material and a second substrate of polymeric fabric material, the first substrate of open cell material being superposed onto the second substrate of polymeric fabric material, and being bonded thereto.

2. A composite coaster assembly as defined in claim 1, wherein said first and second substrates are joined together in a flame lamination process, with the first substrate being bonded to the second substrate by the application of pressure and heat across the interface between the two substrates.

3. A composite coaster assembly comprising a first substrate of polymeric fabric material, a second substrate of polymeric fabric material and a third substrate of open cell polymeric foam material, said fabric substrates being superposed onto opposite sides of said open cell foam substrate and bonded thereto.

4. A composite coaster assembly as defined in claim 1, wherein said open cell foam material comprises flexible polyurethane.

5. A composite coaster assembly as defined in claim 4, said flexible polyurethane material having a density of from about ½ to 2 pounds per cubic foot.

6. A composite coaster assembly as defined in claim 1, wherein said polymeric fabric material comprises polyester fiber which is woven in a stretchable weave.

7. A composite coaster assembly as defined in claim 1, wherein said first substrate comprises a clickable open cell foam material.

* * * * *